Jan. 26, 1965    D. N. JUDELSON    3,166,964
ROTARY KNIFE MACHINE FOR CUTTING MULTIPLE ROLLS
Filed Aug. 13, 1963
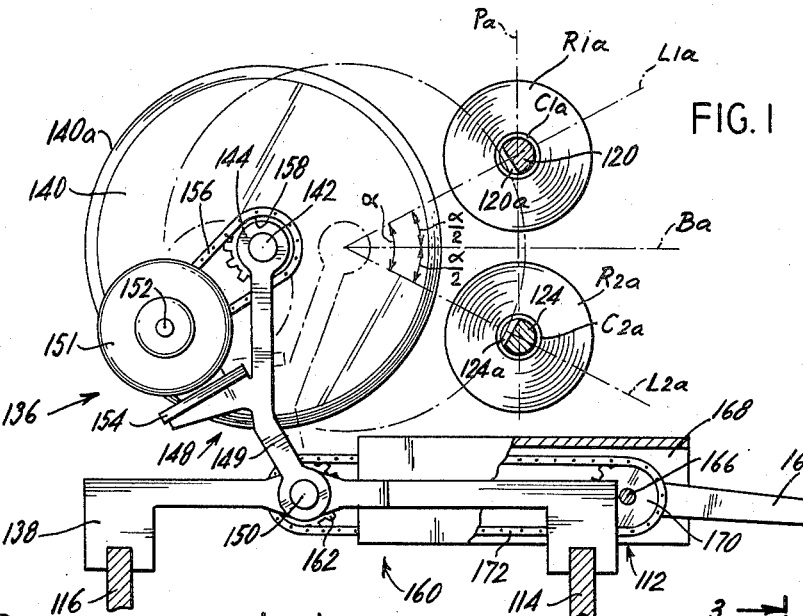
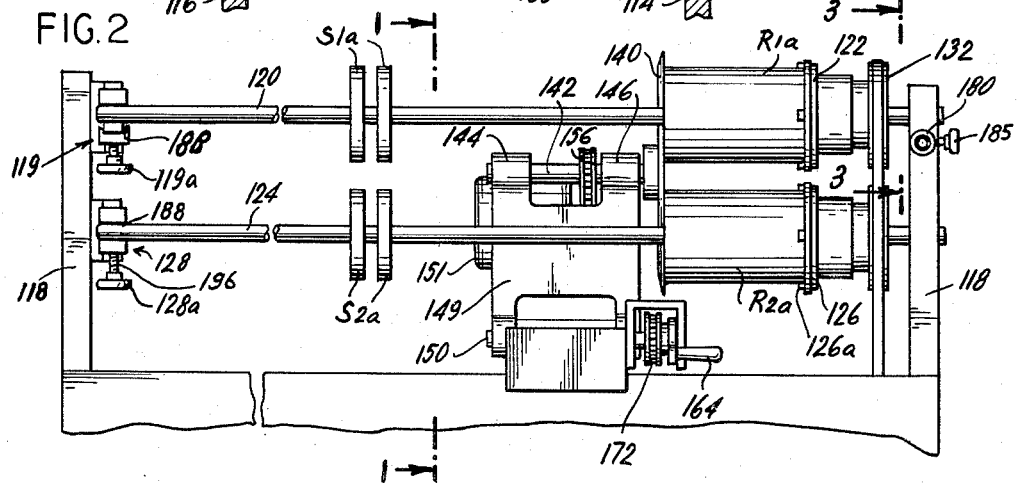
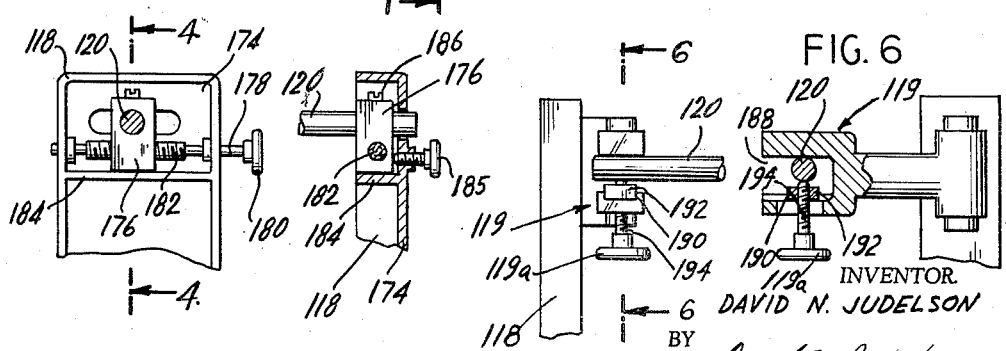
INVENTOR.
DAVID N. JUDELSON
BY
Amster & Levy
ATTORNEYS United States Patent Office 3,166,964
Patented Jan. 26, 1965

3,166,964
ROTARY KNIFE MACHINE FOR CUTTING
MULTIPLE ROLLS
David N. Judelson, New York, N.Y., assignor to Oscar I.
Judelshon, Inc., Jersey City, N.J., a corporation of
New York
Filed Aug. 13, 1963, Ser. No. 301,706
6 Claims. (Cl. 82—78)

The present invention relates generally to machines for cutting material, such as cloth, paper and the like, and in particular to an improved rotary knife type of cutting machine for simultaneously cutting plural rolls of materials each wound on a core into corresponding plural strips or tapes.

Rotary knife cutting machines of the type which enable the manual cutting of a roll of material into a number of strips or cuts of a prescribed width are generally known in the trade and find widespread application, particularly for cutting straight and biased cut fabrics into relatively narrow tapes. Typical of prior art machines is that described in U.S. Patent No. 2,457,310 of December 28, 1948 which includes a frame upon which is supported a stationary shaft for receiving a roll of material wound on a core, as of cardboard. The roll of material is rotated about the longitudinal axis of the stationary shaft by means of a chuck which engages one end of the roll and is driven from an appropriable variable speed drive. A high speed rotary knife is mounted on a knife carrier which is movable toward and away from the stationary supporting shaft. The carrier in turn is mounted on a movable carrier which has an indexing mechanism selectively engageable with the frame of the machine such that the carriage may be moved stepwise through a prescribed traversing stroke for moving the rotary knife into successive cutting positions along the length of the machine towards the chucked end of the roll of material. After each stepwise advance of the carriage, the operator actuates the knife carrier to move the rotary knife inwardly towards the stationary supporting shaft such that the rotary knife moves in a cutting plane substantially at right angles to the longitudinal axis of the roll and shears transversely through the roll of material and its supporting core.

The machine is capable of handling rolls having varying diameters; and for such varying diameters a greater or lesser portion of the forward or cutting stroke of the rotary knife in its cutting cycle will be employed. Due to the large number of cuts which are made, and the often abrasive nature of the materials being cut, it is necessary to make provision for the sharpening of the peripheral cutting edge of the rotary knife. To this end, it is conventional to incorporate a sharpener in the cutting machine which may be engaged by the peripheral cutting edge during every cutting cycle to maintain the sharpness of such peripheral cutting edge, with the attendant grinding down of the rotary knife and reduction in its diameter. This likewise presents no difficulty in that it is merely necessary to advance the rotary knife somewhat more forwardly in its operative or cutting stroke to assure a complete penetration through the roll of material and its supporting core.

The use of such rotary knife cutting machines usually requires the full time attendance of a machine operator, even when using a substantially automatic rotary knife cutting machine of the type disclosed in copending application Serial No. 722,301 filed March 18, 1958 and entitled "Improved Cutting Machine." Further, despite the high speed operation of presently available machines, certain minimum times are required for cutting and the cutting capacity of such machines is limited. It will thus be appreciated that substantial economies could be realized if it were possible to simultaneously cut two rolls under conditions which would meet practical requirements, including the provision of good cuts, the capacity to handle rolls of varying diameters, and the attainment of through cutting despite the wearing of the knife incident to cutting and resharpening and the corresponding decrease in the knife diameter.

Broadly, it is an object of the present invention to provide an improved rotary knife cutting machine which realizes one or more of the aforesaid objectives. Specifically, it is within the contemplation of the present invention to provide a rotary knife cutting machine in which it is possible to simultaneously cut two rolls of material into strips or tapes.

In accordance with an illustrative embodiment demonstrating objects and features of the present invention there is provided a rotary knife cutting machine which comprises a frame, a stationary main shaft adapted to receive a first roll of material and mounted on the frame and a stationary auxiliary shaft adapted to receive a second roll of material and mounted on the frame. The longitudinal axes of the main and auxiliary shafts are disposed in a common plane. Respective first and second chucks are adapted to engage the first and second rolls to rotate the same about the main and auxiliary shafts. A knife carrier is provided on which is mounted a rotary knife which has a peripheral cutting edge and turns about a knife axis and is driven at a relatively high speed. Advantageously, provision may be made for mounting the auxiliary shaft on the frame for adjustment along a path defined by the line through the knife axis and a longitudinal axis for the auxiliary shaft when the rotary knife is in its limit position towards the respective main and auxiliary shafts. The knife carrier is pivotally mounted on the frame for movement toward and away from the common plane such that the horizontal knife axis bisects the angle subtended by the lines through the knife axis and the respective longitudinal axes of the main and auxiliary shafts when the rotary knife is in a limit position wherein the peripheral cutting edge is adjacent the main and auxiliary shafts.

The above brief description as well as further objects, features and advantages of the present invention will be more fully appreciated by reference to the following detailed description of a presently preferred, but nonetheless illustrative embodiment demonstrating features of the present invention, when taken in conjunction with the accompanying drawings, wherein:

FIG. 1 is a sectional view of an alternative embodiment of a rotary knife cutting machine embodying features of the present invention;

FIG. 2 is a fragmentary front elevational view taken from the right of FIG. 1

FIG. 3 is an enlarged fragmentary sectional view taken along the line 3—3 of FIG. 2, looking in the direction of the arrows and showing the adjustable mounting arrangement of the machine.

FIG. 4 is an enlarged fragmentary sectional view, similar to FIG. 3, taken along the line 4—4 of FIG. 6 and looking in the direction of the arrows;

FIG. 5 is an enlarged fragmentary elevational view of a portion of the knife cutting machine shown in FIG. 2 and showing the locking bracket thereof; and FIG. 6 is a sectional view taken along the line 6—6 of FIG. 5 looking in the direction of the arrows and showing the adjustable mounting arrangement for the main shaft.

Referring next specifically to FIGS. 1 to 6 of the drawings there is seen another illustrative embodiment of the invention, various parts of which are assigned reference numerals in the hundred series corresponding to the reference numerals in the tens series assigned to corresponding parts of the first illustrative embodiment.

Extending longitudinally of the machine frame 112 is a main roll supporting and turning arrangement which include a stationary main shaft 120 and a rotatable chuck 122. The stationary main shaft 120 receives the roll of material $R_{1a}$ which is wound on a core $C_{1a}$ as of cardboard (see FIG. 4) and is adapted to be cut into plural strips or tapes $S_{1a}$, as illustrated at the left end of the shaft in FIG. 5. The stationary main shaft 120 is supported at its right end in an appropriate cradle or bearing in the right upstanding end wall 118 and has its opposite end similarly cradled by an upstanding pivoted bracket 119 which is mounted on the left upstanding end wall 118. By appropriately turning a locking handle and screw arrangement 119a (as will subsequently be described in detail, in conjunction with FIGS. 8 and 9) the main shaft 120 can be disengaged, and the bracket 119 may be swung to a position to enable the roll of material $R_{1a}$ to be slipped onto the stationary main shaft 120 and the successive cuts $S_{1a}$ removed therefrom. The chuck 122 which serves to turn the roll $R_{1a}$ about the longitudinal main shaft axis is of the type which includes a number of roll-penetrating pins 122a which may be engaged in the outer periphery of the roll $R_{1a}$ for fixing the same against the adjacent end face of the chuck plate. As previously noted herein, for a detailed description of an improved chuck which may be employed in the present machine, reference may be made to U.S. Patent No. 2,938,733 entitled "Chuck With Roll End Penetrating and Gripping Pawls" of May 31, 1960.

Disposed below the main shaft 120 and in a common vertical plane therewith is an auxiliary roll supporting and turning arrangement which includes a stationary auxiliary shaft 124 and a rotatable chuck 126. The auxiliary shaft 124 receives a roll of material $R_{2a}$ which is wound on a core $C_{2a}$ and is adapted to be cut into plural strips or cuts $S_{2a}$. The stationary auxiliary shaft 124 is supported at its right end in the upstanding end wall or casting 118 (as will be subsequently described in detail in conjunction with FIGS. 2 and 3) and is supported at its left end by a pivoted bracket 128 which may be swung to a clearance position to enable the roll $R_{2a}$ to be inserted over the shaft 124 and engage with the chuck 126 and the cuts or tapes $S_{2a}$ removed from the shaft. The chuck 126 which serves to turn the roll $R_{2a}$ includes a number of rolls penetrating pins 126a and likewise may be of the construction disclosed and described in detail in said U.S. Patent No. 2,938,733.

As seen in FIG. 2 the chucks 122, 126 are rotated about the respective stationary main and auxiliary shafts 120, 124 at the prescribed roll-turning speed by an appropriate chuck motor (not shown) which has its output coupled via a drive belt 130 to respective driven pulleys 132, 134 operatively connected to the chucks 122, 126. Since the details of the drive to the chucks 122, 126 is generally understood and is disclosed in detail in U.S. Patent No. 2,938,733, further description is dispensed with in the interest of brevity.

Mounted on the machine frame 112 is a knife assembly, generally designated by the reference numeral 136, which includes a knife carriage 138. The knife carriage 138 is mounted for movement longitudinally of the machine frame on the front and rear longitudinally extending rails 114, 116 and may be indexed through successive longitudinal traversing increments or strokes to bring the knife assembly 136 in successive cutting positions.

The knife assembly 136 further includes a high speed rotary knife 140 having a peripheral cutting edge 140a which is adapted to simultaneously penetrate through the multiple plies of the rolls $R_{1a}$, $R_{2a}$ and their respective cores $C_{1a}$, $C_{2a}$. The rotary knife 140 is mounted on a horizontal knife shaft 142 which extends parallel to the main and auxiliary shafts 120, 124. The knife shaft 142, as seen best in FIG. 2, is journaled in spaced bearings 144, 146, with the knife 140 being attached to the right end of the knife shaft 142 outwardly of the bearing 146 by an appropriate integral hub 140b. The bearings 144, 146 in turn are mounted on a knife carrier 148 which is pivotably movable toward the shafts 120, 124. The knife carrier 148 includes a lever arm 149 which is keyed to a pivoted shaft arrangement 150 at one end and the shaft 150 is disposed in bearing bores in the carriage 138, as shown in FIG. 1 such that the knife carrier 148 and its associated mechanisms may be pivoted fore and aft of the machine frame in the various longitudinally indexed positions of the knife carriage 138.

The knife shaft 142 is driven at the requisite high speed for rotating the knife 140 by a knife motor 151 which is mounted on the carrier 148 rearwardly of the bearings 144, 146, with the motor shaft 152 extending parallel to the knife shaft 142. For the purpose of mounting the motor 151 in this manner, a platform 154 is integrally formed with the lever arm 149, and extends rearwardly therefrom. Accordingly, the motor shaft 152 is coupled to the knife shaft 142 by an appropriate driving sprocket mounted on the motor shaft which is coupled by a chain 156 to a driven sprocket 158 fixed to the knife shaft 142 intermediate the bearings 144, 146.

The knife carrier 148 and the rotary knife 140 are pivoted through a cutting cycle from the retracted position illustrated by the full lines in FIG. 1 to the forward limit position illustrated by the dot-dash lines through the provision of an appropriate manual or automatic knife cycling means. Typical of such appropriate means for pivoting the knife carrier 148 and the rotary knife 140 through the cutting cycle is the illustrated manually operated chain and sprocket mechanism 160 mounted on the pivot pin 150 and disposed below the respective outer peripheries of knife 140 and material rolls $R_{1a}$, $R_{2a}$ and extending longitudinally of the machine frame parallel to the main and auxiliary shafts 120, 124. The pivotal shaft arrangement 150 is journaled on the knife carrier 138 by appropriate bearings and carries a driven sprocket wheel 162 on its free end and disposed below the knife 140. The pivotal shaft 150 is rotated to advance and retract the knife carrier 148 and the rotary knife 140 through the provision of a hand lever 164 mounted on a hand lever shaft 166 journaled on a bracket 168 fixed to the forward side of the carriage 138. Thus, the knife motor 151 is provided with a mounting bracket for securing motor 151 to platform 154 so that the motor can be carried by carrier 148. The hand lever shaft 166 carries a driving sprocket wheel 170 which is coupled to the driven sprocket 162 on the pivotal shaft 150 by an appropriate chain 172.

As seen best in FIG. 1, the longitudinal axis of the main and auxiliary shafts 120, 124 are in a common vertical plane, shown by the broken line and designated by the letter $P_a$. The respective shafts 120, 124 are provided with flats 120a, 124a which are directed angularly of the plane $P_a$ towards the adjacent peripheral cutting edge 140a of the high speed rotary knife 140 such that through penetration of the cardboard cores $C_{1a}$, $C_{2a}$ may be achieved without scoring or otherwise damaging the main and auxiliary shafts 120, 124 or for that matter the knife 140.

The knife carrier 148 mounts the knife 140 for movement towards and away from the common vertical plane $P_a$ such that the horizontal knife axis $B_a$ bisects the angle subtended by the lines through the longitudinal axis of the knife 140 and the respective longitudinal axes of the main and auxiliary shafts 120, 124 when the rotary knife 140 is in a limit position wherein the peripheral cutting edge 140a is adjacent the main and auxiliary shafts 120, 124. With the knife 140 in its illustrated inner limit position, corresponding to the penetration of the peripheral cutting edge 140a through the cardboard cores $C_{1a}$, $C_{2a}$, it will be appreciated that the line $L_{1a}$ which extends through the knife shaft 142 and the main shaft 120 and the line $L_{2a}$ which extends through the knife shaft 142 and the auxiliary shaft 124 define an angle with the horizontal knife axis $B_a$ bisecting the angle.

As seen in FIGS. 3 and 4, provision is made for adjustably mounting the main shaft 120 for movement along an adjustment path which is horizontal with respect to the machine frame 112. This adjustment facilitates the initial positioning of the main shaft 120 with respect to the auxiliary shaft 124 and to the knife shaft 142 to obtain the desired cutting action. Specifically, a guideway 174 is provided in the end wall or casting 118 which provides a guide path which is horizontal with respect to the machine frame 112. A mounting block 176 is slidably mounted in the guideway 174 and may be secured in various horizontal adjusted positions therealong by the provision of an adjusting screw 178 having an adjustment handle 180 mounted on its free end and disposed axially of the guideway 174 and journalled to rotate freely in corresponding bores in the opposite end walls communicating with the guideway 174.

As best seen in FIG. 3, the main shaft 120 is fixed to the mounting block 176 which is provided with an internally threaded bore for engaging the threaded portion 182 of the adjusting screw 178. Thus, by rotating the adjusting handle 180, the mounting block 176 will slide along the bottom wall section 184 of guideway 174 along a horizontal adjustment path with respect to the machine frame 112. The mounting block 176 and shaft 120 can also be adjusted laterally with respect to the frame 112 by means of an adjustment screw and handle arrangement 185 which is threadably received in the right sidewall 118. As best seen in FIG. 4, further lateral adjustment of the shaft 120 is provided by a set screw 186 threadably received in mounting block 176 for securing shaft 120.

The brackets 119 and 128 are pivotally mounted on the left side wall 118 and are provided with appropriate slots 188 for receiving the ends of shafts 120, 124. The bracket 119 allows for horizontal adjustment of the main shaft 120 with respect to the machine frame 112, corresponding to the horizontal adjustment of the opposite end of shaft 120 in the right side wall 118, as outlined above. Accordingly, the bracket 119 is provided with a groove 190 located in its slot 188. As best seen in FIG. 6, a sliding member is 192 is disposed in groove 190 and sliding member 192 has a suitable internally threaded bore for receiving the shank 194 of the locking handle and screw arrangement 119a. Thus the locking handle and screw arrangement can be threadably engaged with the sliding member 192 to secure the end of shaft 120 in the slot 188 of bracket 119, after proper adjustment has been made.

The bracket 128 allows for the same pivotal movement of the shaft 124 as bracket 119, but and securement of the shaft 124 as bracket 119, but bracket 128 does not provide any horizontal adjustment as does bracket 119. The bracket 129 includes a suitably internally threaded bore for receiving the shank 196 of the locking handle and screw arrangement 128a. Thus the shaft 124 is locked in place in slot 188 of bracket 128 in a fixed position, and all adjustment is made with respect to shaft 120 as outlined above.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In a rotary knife cutting machine, a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal axes of said main and auxiliary shafts being disposed in a common plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a horizontal knife axis, a drive on said knife carrier for rotating said rotary knife about said knife axis, and means mounting said knife carrier on said frame for pivotal movement toward and away from said common plane such that said horizontal knife axis bisects the angle subtended by the lines passing through the longitudinal knife axis and the respective longitudinal axes of said main and auxiliary shafts when said rotary knife is in a limit position wherein said peripheral cutting edge is adjacent said main and auxiliary shafts.

2. In a rotary knife cutting machine according to claim 1, means for mounting said main shaft on said frame for movement along a horizontal adjusting path with respect to the machine frame.

3. In a rotary knife cutting machine, a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal axes of said main and auxiliary shafts being disposed in a common vertical plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a horizontal knife axis, a drive on said carrier for rotating said rotary knife about said horizontal axis, and means mounting said knife carrier on said frame for pivotal movement toward and away from said vertical plane such that said horizontal knife axis bisects the angle subtended by the lines passing through the longitudinal knife axis and the respective longitudinal axes of said main and auxiliary shafts when said rotary knife is in a limit position wherein said pheripheral cutting edge is adjacent said main and auxiliary shafts.

4. In a rotary knife cutting machine a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal center lines of said main and auxiliary shafts being disposed in a common vertical plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a horizontal axis, a drive on said knife carrier for rotating said rotary knife about said horizontal axis, means mounting said knife carrier on said frame for pivotal movement toward and away from said vertical plane such that said horizontal knife axis bisects the angle subtended by the lines through the longitudinal knife axis and the respective longitudinal axes of said main and auxiliary shafts when said rotary knife moves into a limit position wherein said peripheral cutting edge is adjacent said main and auxiliary shafts, and means for adjusting the stationary position of said auxiliary shaft relative to said frame including a guideway defining an adjustment path along a line through the horizontal axis of said frame, a mounting block operatively connected to said auxiliary shaft and slidably mounted in said guideway, and means for releasably securing said mounting block in various adjusted positions along said guideway.

5. In a rotary knife cutting machine, a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal center lines of said main and auxiliary shafts being disposed in a common vertical plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a horizontal axis, a drive on said knife carrier for rotating said rotary knife about said horizontal axis, means mounting said knife carrier on said frame for pivotal movement toward and away from said vertical plane such that said horizontal knife axis bisects the angle subtended by the lines through the longitudinal knife axis and the respective longitudinal axes of said main and auxiliary shafts when said rotary knife moves into a limit position wherein said peripheral cutting edge is adjacent said main auxiliary shafts, and means for adjusting the stationary position of said main shaft relative to said frame along an adjustment path which is horizontal with respect to the frame.

6. In a rotary knife cutting machine, a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal axes of said main and auxiliary shafts being disposed in a common plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a longitudinal knife axis, a drive on said knife carrier for rotating said rotary knife about said knife axis, and means mounting said knife carrier on said frame for pivotal movement through a stroke toward and away from said common plane such that said knife cuts through said rolls to an inner limit position wherein said peripheral cutting edge is adjacent said main and auxiliary shafts.

No references cited.

WILLIAM W. DYER, Jr., *Primary Examiner.*
LEON PEAR, *Examiner.*